United States Patent [19]
Froment et al.

[11] Patent Number: 5,193,590
[45] Date of Patent: Mar. 16, 1993

[54] SPRING ATTACHMENT FOR NEGATIVE DOBBIES

[75] Inventors: Jean-Paul Froment; André Fumex, both of Faverges, France

[73] Assignee: S.A. des Etablissements Staubli, Faverges, France

[21] Appl. No.: 818,258

[22] Filed: Jan. 8, 1992

[30] Foreign Application Priority Data

Feb. 1, 1991 [FR] France .................. 91 01401

[51] Int. Cl.$^5$ .............................................. D03C 1/14
[52] U.S. Cl. ........................................ 139/82; 24/702; 403/406.1; 267/179
[58] Field of Search ............... 24/702, 669; 403/329, 403/405.1, 406.1; 267/179; 139/82, 84

[56] References Cited

U.S. PATENT DOCUMENTS 1,777,146  9/1930  McGlaughlin ............ 24/669 X
3,973,744  8/1976  Hintzman ................ 403/329 X
4,603,713  8/1986  Takada ..................... 139/82
4,687,029  8/1987  Takada et al. .
4,905,739  3/1990  Froment .
5,002,097  3/1991  Yokoi ....................... 139/82

FOREIGN PATENT DOCUMENTS 353875  2/1990  European Pat. Off. .
298758 10/1928  United Kingdom .

Primary Examiner—Andrew M. Falik
Attorney, Agent, or Firm—Dowell & Dowell

[57] ABSTRACT

In a spring system for dobbies and other weaving mechanisms of the negative type which includes hooking elements, each of the hooking elements includes, parallel to its edges which face the springs, a row of omega-sectioned openings which receive, by a lateral displacement along the axis of the opening, an endpiece of a shape to be seated within the openings.

4 Claims, 3 Drawing Sheets

SPRING ATTACHMENT FOR NEGATIVE DOBBIES

BACKGROUND OF THE INVENTION

1. Field of the Invention

The present invention relates to dobbies and other weaving mechanisms of the negative type for forming the shed in weaving looms, and more particularly to the spring systems which, in this type of mechanism, ensure return of the heddle frames.

2. History of the Related Art

Mechanisms of the negative type are known to operate positive control of the heddle frames acting only in one direction of the reciprocating stroke thereof, so that resilient elements should be provided, arranged so as to return the frames to the other end of the stroke. These resilient elements are most often constituted by two systems formed by parallel springs retained between two hooking elements of which one is mounted on a console or rack secured to the fixed structure of the loom, while the other is hooked either to the end of one of two cables provided for maneuvring each frame, or to a rocking guide lever associated with the cable.

It will be readily appreciated that the springs of each spring system are thus placed in tension during positive control of a frame by the weaving mechanism so that as the mechanism has arrived at the end of stroke the spring system will act on the cable or lever to return the frame to its initial position.

In practice and as illustrated in FIG. 1 of the accompanying drawings, each hooking element generally includes two parallel plates a assembled to one another by transverse ties b which are fixed by rivetting or crimping. For fastening the springs c, endpieces d in the form of hooks are conventionally provided and are adapted to cooperate in a removable manner with one of a row of small rods e rivetted on the plates a in a line oriented perpendicularly to the axis of the springs.

The prior art is illustrated by documents DE-A-3 533 336 (MURATA KIKAI), FR-A-2 626 013 (STAUBLI), GB-A-298 758 (HARLING and TODD) and EP-A-353 875 (YOKOI INDUSTRIES).

It should be observed that, due to the high operational speeds now conferred on weaving machines, more and more considerable forces are demanded of the spring systems, with the result that the springs break relatively frequently. Now, although it is fairly easy to replace a broken spring when the operation concerns one of the two side systems of the group of spring systems provided on one of the sides of a group of heddle frames. This is not so when it is question of extracting a broken spring and mounting a new one in the interior systems of the group. In fact, replacement involves dismantling and remounting a large number of systems and springs, all of which are in addition subjected to very high tension.

Furthermore, it is of interest to note that, due to their configuration, the hooks which connect the springs on the hooking elements, are subject to bending forces and are consequently the location of frequent breaks which stops the operation of a weaving machine.

SUMMARY OF THE INVENTION

It is an object of the present invention to overcome the drawbacks set forth hereinabove by providing a spring system for dobbies and other weaving mechanisms of the negative type, which includes at least one hooking element on which are hooked endpieces provided at the ends of a series of parallel springs, characterized in that the hooking element is provided, at its edge facing the springs, with a series of openings of omega shape or profile which open out via a narrowed part on the edge thereof and which open freely on the lateral faces thereof in order to allow assembly and dismantling, by lateral access, of the endpieces fixed to the ends of these springs. The endpieces are thus suitably retained in place inside the omega openings.

BRIEF DESCRIPTION OF THE DRAWINGS

The invention will be more readily understood on reading the following description with reference to the accompanying drawings, in which.

As indicated in the preamble.

DESCRIPTION OF THE PREFERRED EMBODIMENT

Figure 1:
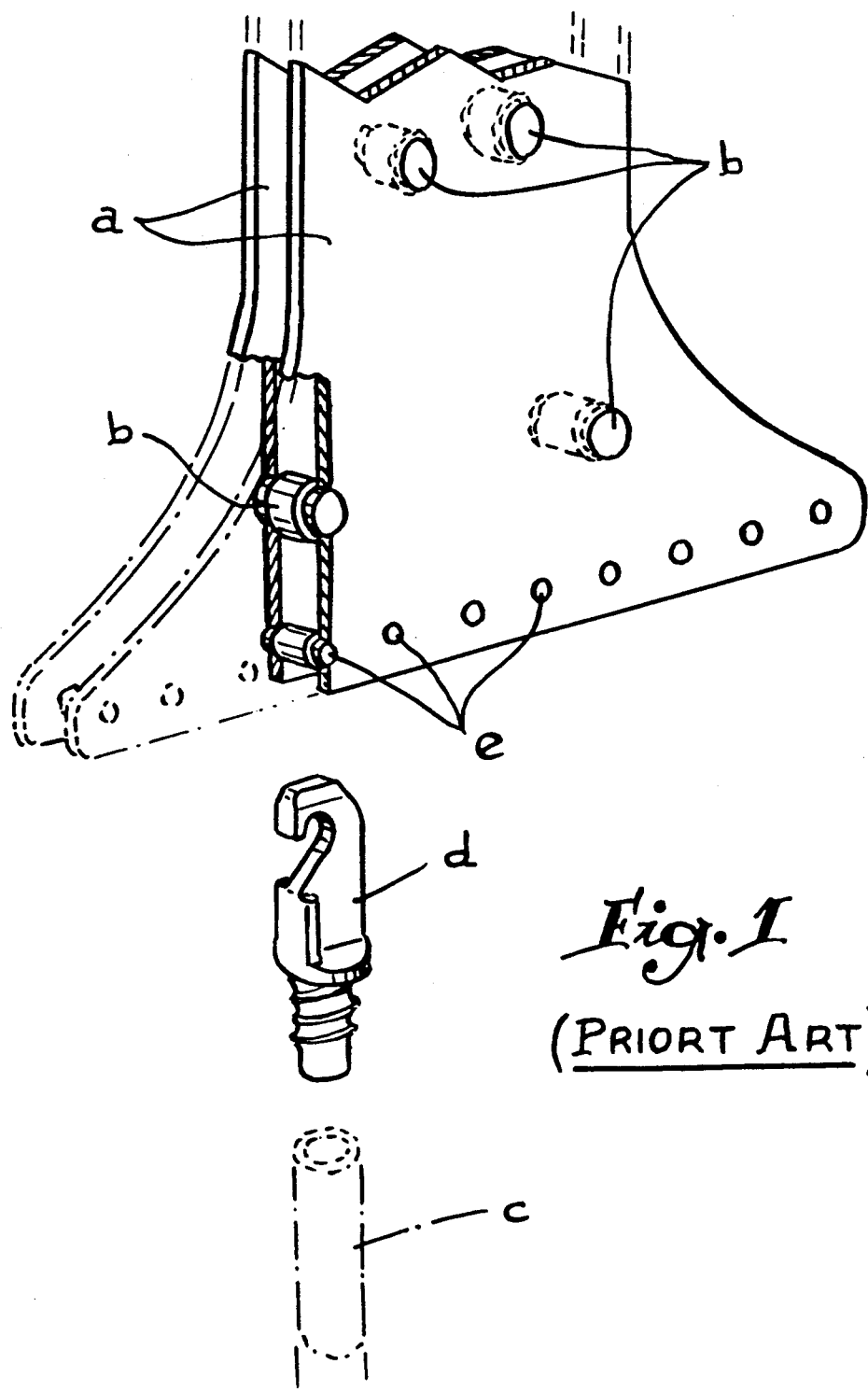
FIG. 1 is a perspective view illustrating the arrangement of the hooking elements of conventional spring systems.
Figure 2:
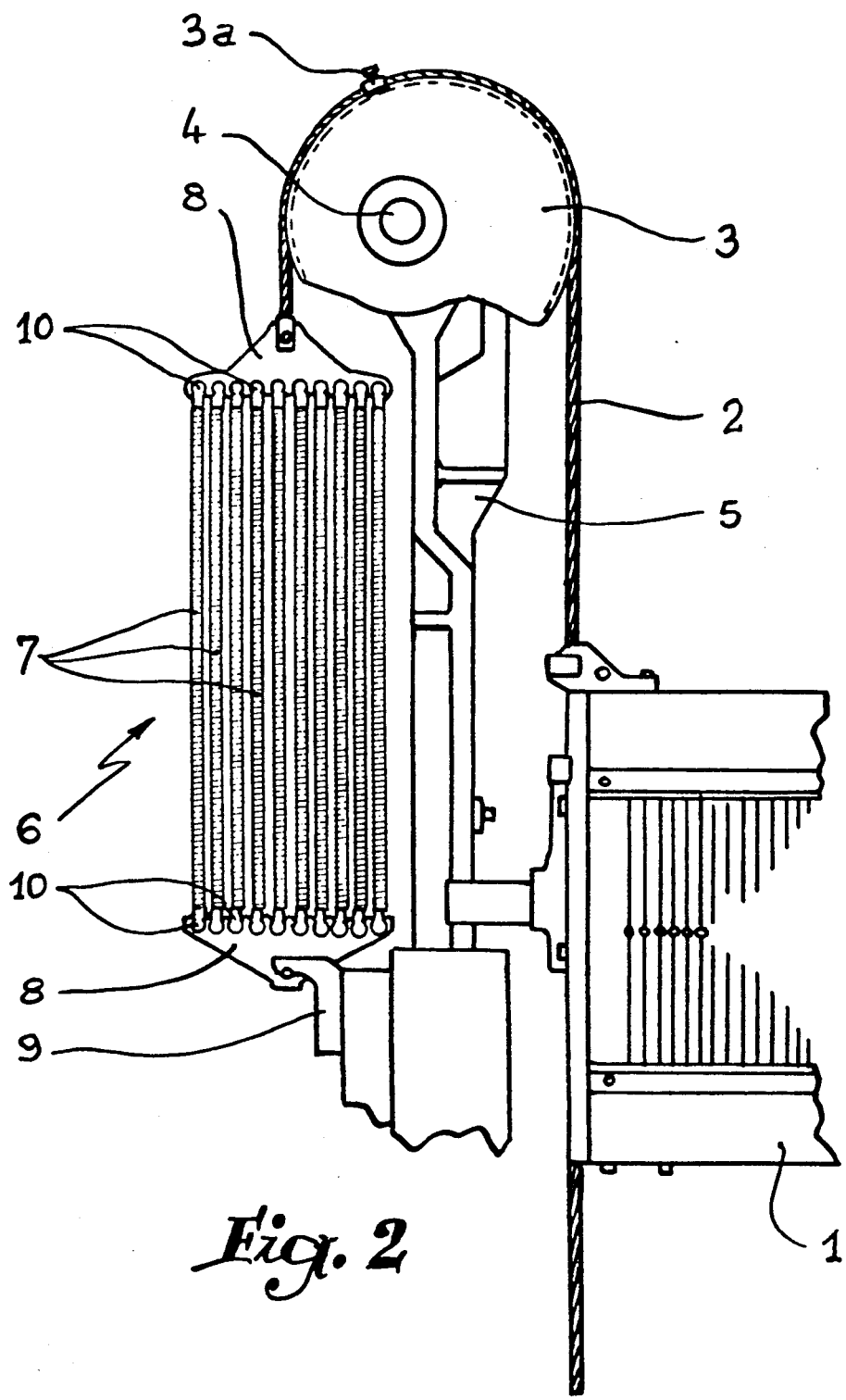
FIG. 2 is a view in elevation showing the assembly of a spring system according to the invention on one of the sides of a weaving loom.

Referring again to the drawings, reference 1 in FIG. 2 designates one of the heddle frames which are mounted on a weaving loom and of which each is moved vertically by two cables 2. One of the ends of each cable 2 is attached to one of the levers of a dobby or other mechanism, while the opposite end is guided by a rocking lever 3 mounted idly on a horizontal shaft 4 carried by the fixed structure 5 of the loom. The free end of the cable 2, fixed to the lever 3 at 3a, is coupled to a return spring system 6 formed by a plurality of vertical springs 7 of which the ends are secured to two hooking elements 8. The upper hooking element 8 is fixed to the end of the cable 2 so as to move vertically therewith, while the lower hooking element 8 cooperates with a rack 9 secured to the fixed structure 5.

Figure 3:
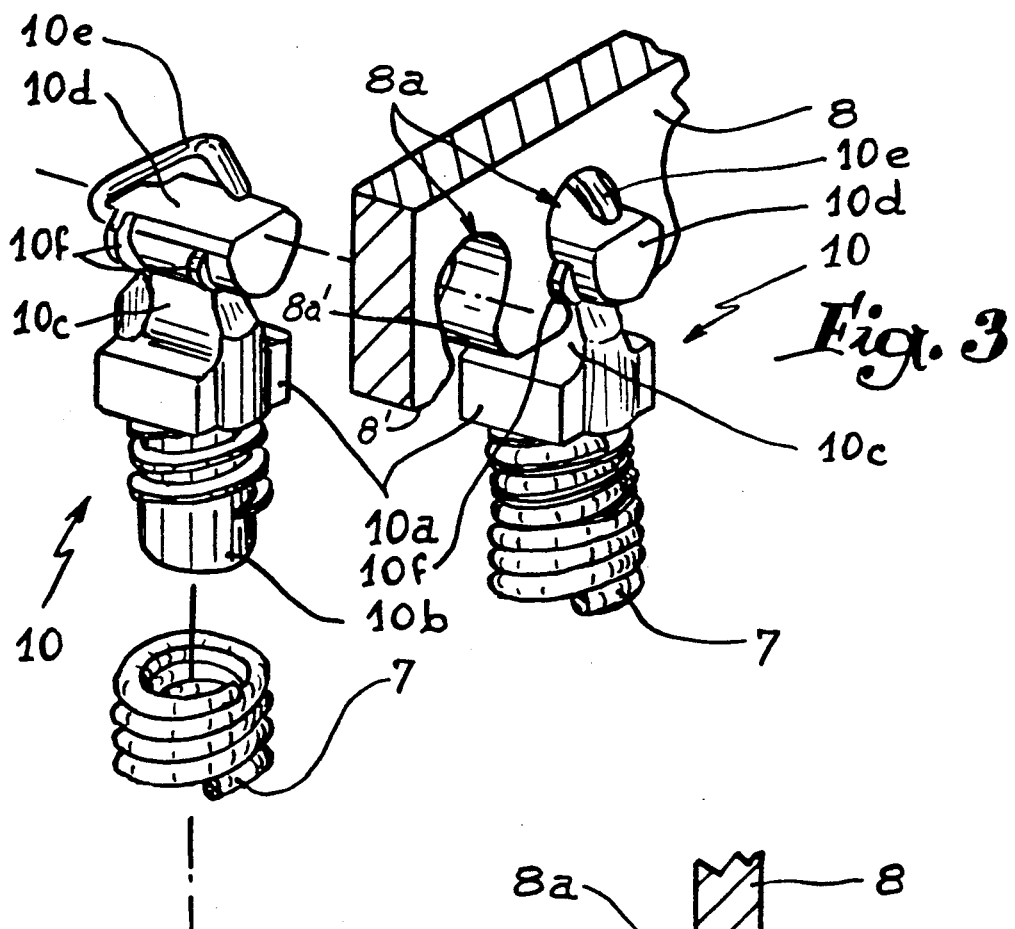
FIGS. 3 and 4 are sections on a larger scale, illustrating the shape of one of the two hooking elements of the spring system of FIG. 2.
Figure 4:
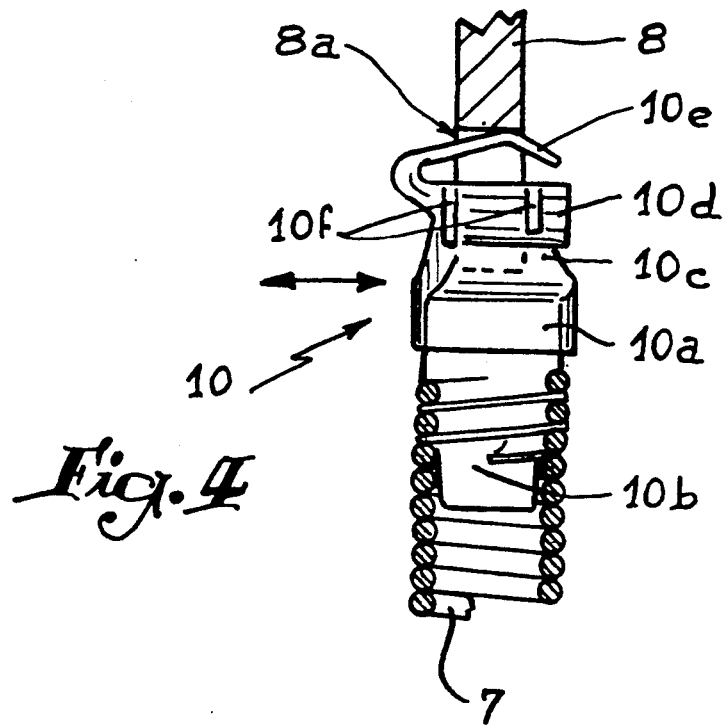

As shown in FIGS. 3 and 4, each hooking element 8 is includes a relatively thick monobloc piece which may be directly obtained by cut-out/stamping to obtain the triangular profile visible in FIG. 2. On the horizontal edge which faces the springs 7, each hooking element 8 has a series of openings 8a cut out therein, in a number equal to that of said springs. FIG. 3 shows the omega section of each opening 8 which is open on the opposite lateral faces of the hooking element 8 and which opens out on the free or outer edge 8' thereof by a passage 8a' of reduced section.

Each of the ends of each spring 7 receives an endpiece 10 made of synthetic material and arranged to be cooperate seated within one of the omega openings 8a of one or the other of the two hooking elements 8. Each endpiece 10 includes a principal body 10a which is connected at one end with a cylindrical base 10b provided to be threaded in order to screw into the end of a spring 7 and on the other end with a thin neck 10c secured to a semi-cylindrical stop 10d which is provided with a deformable tab 10e. It will be observed that the stop 10d includes two projections 10f which extend laterally thereof.

The endpiece 10 may be dimensioned so that the stop 10d engages in an opening 8a by lateral introduction from one or the other of the faces of the hooking element 8 shown. The neck 10c fits in the narrowed passage 8a' of the opening 8a. Removal of the endpiece in the horizontal direction is prevented by clipping projections 10f against the lateral faces of the hooking element, in the vertical direction by the pad 10e bearing against the part of the wall defining the opening 8a which is opposite the narrowed passage, as clearly illustrated in FIG. 4.

The removal of a broken spring and replacement by a new spring may be very easily accomplished even when the replacement concerns a system 6 which is located inside the group of systems provided on each side of the loom. The lateral movement of removal or positioning of an endpiece 10 in an opening 8a may effectively be obtained without it being necessary to dismantle and subsequently remount springs other than the one which requires replacement.

It will be observed that the endpieces 10 have a symmetrical section which avoids any bending effort. These endpieces are solely subject to traction forces along their axis and consequently provide, with equal space requirement, an increased resistance with respect to the conventional hook-shaped endpieces.

It will be readily appreciated that the precise section of each endpiece 10 may vary to a certain extent as long as it retains the corresponding spring and its positioning and removal may be obtained by a horizontal movement along the axis of the omega-sectioned opening 8a.

What is claimed is:

1. In a spring system for dobbies and other weaving mechanisms of the negative type which includes at least one hooking element on which are connected endpieces provided at the ends of a series of parallel springs and wherein the hooking element has lateral faces and an outer edge, the improvement comprising,
   a series of openings of omega profile which open out through a narrowed passage to the outer edge of the hooking element and which are open on the lateral faces thereof so as to allow assembly and dismantling, by lateral access, of the endpieces provided at the ends of the springs, and the endpieces being retained within said omega openings.

2. The spring system of claim 1, wherein each endpiece includes means for elastically retaining it in said openings.

3. The spring system of claim 1, wherein each endpiece includes a thin neck shaped to fit in the narrowed passage and a stop for seating in one of said openings, which stop includes two projections for clipping on either side of the lateral faces of the hooking element and a deformable tab facing opposite said neck which is resiliently engageable within the opening adjacent said stop.

4. The spring system of claim 1, wherein the hooking element is a monobloc piece.

* * * * *